United States Patent

Dreyfus

[15] 3,657,709

[45] Apr. 18, 1972

[54] STORAGE TUBE WITH POINTWISE ERASE CAPABILITY

[72] Inventor: Russell W. Dreyfus, Cross River, N.Y.

[73] Assignee: International Business Machines Corporation, Armonk, N.Y.

[22] Filed: Dec. 30, 1969

[21] Appl. No.: 889,107

[52] U.S. Cl. ...............340/173 CR, 340/173 R, 340/173 CC

[51] Int. Cl. ....................................G11c 11/26, G11c 11/42

[58] Field of Search..................340/173 R, 173 CR, 173 CC

[56] References Cited

UNITED STATES PATENTS

| | | | |
|---|---|---|---|
| 3,296,594 | 1/1967 | Van Heeroen | 340/172.5 |
| 3,428,396 | 2/1969 | Megla | 353/29 |
| 3,452,332 | 6/1969 | Bron | 340/173 |
| 3,466,616 | 9/1969 | Bron | 340/173 |
| 3,518,634 | 6/1970 | Ballman | 340/173 |

*Primary Examiner*—Terrell W. Fears
*Attorney*—Hanifin and Jancin and Jackson E. Stanland

[57] ABSTRACT

A beam addressable display and storage tube having pointwise erase capability. Each localized storage element has associated therewith an erase element which is energized by a writing beam or another beam to provide output energy for erasing the information contained in the associated storage element. In addition to storage and display, memory applications exist. Any beam addressable storage element can be used including those which form color centers or which have their color centers altered upon impact of a beam of energy.

20 Claims, 12 Drawing Figures

INVENTOR
RUSSELL W. DREYFUS

BY T. E. Saulant

AGENT

STORAGE TUBE WITH POINTWISE ERASE CAPABILITY

BACKGROUND OF THE INVENTION

1. Field of Invention

This invention relates to beam addressable storage tubes and in particular to storage devices which are capable of localized erasure of previously stored information.

2. Description of the Prior Art

In previous storage tubes, information is written into the tube by scanning with an electron beam. An example of such a tube is a dark-trace type in which the images are formed by an electron beam striking a crystalline screen (usually potassium chloride) which forms color centers. The image remains on the screen until the color centers are removed which is accomplished by heating the entire screen or by flooding the entire screen with light. An example of such a storage tube is that described in U.S. Pat. No. 3,466,616, which is assigned to the same assignee as the present application.

In a conventional storage tube of the type described above, erasure occurs when the entire screen is heated (or flooded with light). This means that all the information is lost even if it were desired to erase only a small area. For many operations, this is a very inefficient type of operation, since it may be desirable to retain most of the information while changing only portions of the information displayed.

In prior storage tubes, an electron beam which is easily deflected and modulated is used only for writing. The energy needed for erasure of information is of a different kind, and is not easily deflected and modulated. Therefore, these prior tubes have an inherent disadvantage since it is not possible to use a single type of energy to effect both writing and erasing.

In addition to the inefficiency resulting from entire loss of information and subsequent total rewriting, there is a problem of peeling and flaking of the storage material from the screen due to the large amounts of energy required to erase the whole screen. The thermal cycling caused by the use of large amounts of energy produces excessive strains in the storage material which frequently cause it to peel or flake due to the large heat coefficient of expansion.

Because of the excessive heat conditions, necesitated by the write and erase operations, expensive fabrication techniques are required in order to manufacture these tubes. As is readily appreciated by those of skill in the art, complex and extensive techniques are required in order to make target screens which can withstand repeated high temperature erase cycles. Further, large power requirements are required in these tubes since the entire screen has to be erased at one time.

Accordingly, it is a primary object of this invention to provide a beam-addressable storage tube having pointwise erasure capability.

Another object of this invention is to provide a beam-addressable storage tube which is more easily fabricated and which requires less power to operate than conventional storage tubes.

Another object of this invention is to provide a storage and display device, using conventional storage elements, which requires only one type of energy for effecting both writing and erasing.

Still another object of this invention is to provide a beam-addressable storage tube in which thermal cycling due to storage and erasure of information does not seriously damage the tube.

A further object of this invention is to provide a beam addressable storage tube having localized erasure capability, which tube is readily adaptable for color displays.

SUMMARY OF THE INVENTION

This beam-addressable storage tube is useful for both display and memory applications. The writing source is a beam of energy, such as an electron beam or a light beam, and the storage elements are any beam activated storage elements. These storage elements include both photochromic elements, which change color when illuminated, and photodichroic elements, which alter the orientation of their color centers upon application of light of particular polarization. That is, any material which forms color centers or which has its colors centers altered upon application of energy is suitable as a storage element.

The target comprises a plurality of discrete storage elements or a sheet of material which is capable of localized storage. These elements can be deposited directly on the innerside of the glass face of the tube, since tube operation with minimum heat loss is possible. In contrast with prior storage tubes, it is not necessary that the storage elements be placed on a mica sheet which is then spaced from the inner side of the glass tube face.

Associated with each storage element and usually positioned adjacent each storage element, is an erase element. The erase element is activated by an erase beam (which can be the same as the writing beam) and produces energy which usually is either heat or light. The same kind of energy which is used to write information into the storage element is also used to activate the erase element. The energy output from the erase element enters the storage element and erases information contained therein. The erase element could be, for instance, a small deposit of metal, such as copper or a phosphor element, or a light emitting diode, etc. The function of the erase element is to produce output energy when activated, which energy will strike the associated storage element and erase information contained therein. Each erase element can be associated with more than one storage element. Also, a storage element can have associated with it more than one erase element.

No special circuitry or controls are needed with this storage tube. The reading and writing beams can be those produced by conventional electron guns, or by light sources, such as a laser. The deflection for the beams is that which is conventionally known.

Memory applications are possible when the storage tube has a window for an input light, and a light scanning element, such as a vidicon tube. The input light beam to the storage tube produces a visual display which is scanned by the vidicon tube in order to produce electrical signals representative of the displayed information.

Because localized erasure is possible, the entire target screen need not be heated in order to erase information. This means that in addition to the increase in speed of operation, less power is required for each heat cycle and also less power is required for writing information. In addition, because less heat is generated, there is only a small possibility of damage to the storage elements or to the entire target screen. This substantially reduces peeling and flaking of the storage material from its substrate backing.

The foregoing and other objects, features, and advantages of the invention will be apparent from the following more particular description of the preferred embodiments of the invention as illustrated in the accompanying drawings.

DESCRIPTION OF THE PREFERRED EMBODIMENTS

Figure 1:
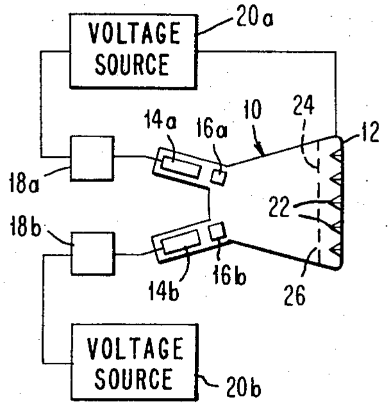
FIG. 1 shows a display and storage tube having localized erasure capability.
Figure 1A:
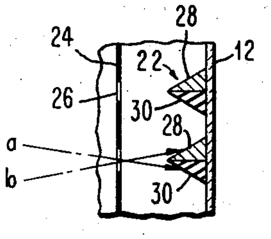
FIGS. 1A and 1B are two enlarged fragmentary views of a target screen which may be used in the display tube of FIG. 1.

An illustrative storage and display device 10 is shown in FIG. 1, which is capable of producing localized erasure in accordance with the invention. Tube 10 is of the conventional type, having a face portion 12 at one end and at the other a pair of conventional electron guns 14a and 14b which produce beams *a*, *b* (FIG. 1A). Both electron guns have associated therewith deflection units 16a, 16b respectively. In this embodiment a beam (*b*) from one gun 14 is employed for writing while a beam (*a*) from the other gun 14 is employed for erasure. In contrast with prior tubes, the same type of energy (here, electron beam energy) is used to effect both writing and erasure. As will become apparent subsequently, a single beam, and hence a single gun, may be employed for both the write and erase junctions. Of course, different angles of incidence are needed to accomplish writing and erasure. This is easily within the skill of one who is familiar with these tubes.

Conventional control circuitry 18a, 18b is connected to guns 14a and 14b, respectively, and each gun in turn is connected to a voltage source 20a and 20b, respectively. The control circuitry 18 is employed to selectively modulate the the intensity of the guns 14, in a conventional manner. Also connected to the voltage source 20a is the tube itself, in order to provide a positive voltage to the tube. For instance the inner surface of a glass tube can be conducting, as is well known in the CRT art.

Located within the tube 10, on the inner surface of portion 12, is a plurality of discrete data retention elements (storage elements) 22. Located opposite the inner face of portion 12 within tube 10 and between the guns 14 and elements 22 is a metal mask 24 having apertures 26. The function of mask 24 is to limit exposure of the beams from guns 14 to only those areas containing elements 22, as can be seen more readily by reference to FIG. 1A.

Referring to FIG. 1A, an enlarged fragmentary view of a portion of mask 24 and face 12, with elements 22 as its inner surface, is shown. Elements 22 are deposited directly on the inner face of portion 12 by conventional techniques, such as sputtering through a mask, spraying from a slurry, and fastening individually, etc. Such techniques are well known in the TV industry and need not be further explained. Elements 22 include a storage portion 28 and an erase portion 30. The storage portions of elements 22 are made of a material which produces color centers or which has its color center orientations altered by the application of input energy. A suitable material is hackmanite, or potassium chloride. In addition, dichroic materials are possible, as can be seen by reference to the aforementioned U.S. Pat. No. 3,466,616 and U.S. Pat. No. 3,452,332. In general, any beam addressable storage element is suitable.

As an aid to those practicing this invention, the following references are listed:

J.H. Schulman et al, *Color Centers in Solids* (MacMallan Co., 1962)

H.H. Poole, *Fundamentals of Display Systems*, (Spartan Books, 1966)

R.D. Kirk, J. Electrochem. Soc. 101, 461 (1954)

K. Przibram et al, *Irradiation colours and Luminescence*, (Pergamon Press, 1956)

F. Luty, *Physics of Color Centers*, (ed. W. Beall Fowler, Academic Press, New York 1968)

Generally, these references and U.S. Pat. No. 3,466,616 describe various display and storage systems, as well as the physics of operating with storage materials of this type.

The erase portions 30 of elements 22 can be made of a material which exhibits suitable heat producing qualities, such as copper, or exhibits suitable light producing qualities, such as phosphor, or a light emitting diode. Similarly to the storage portions 28 of elements 22, the erase portions can be deposited by sputtering through a mask, spraying from a slurry, or by individual fastening, etc. For instance, the storage portions 28 can be sputtered through a mask onto the inner face of portion 12, then the mask is shifted a small amount (approximately the width of the deposited storage portions) and the erase portions are sputtered onto the inner face of portion 12. The erase portions will be adjacent the storage portions and can overlap the storage portions, if necessary.

As another method of depositing the storage elements 22, the material comprising the storage portions 28 is sprayed onto the inner face of tube portion 12, from an aqueous slurry. The erase portions 30 are deposited adjacent the storage portions 30 by spraying from a slurry, but at a slightly different angle than the spraying which produced the storage portions 28. This technique is very similar to the well-known method of producing color TV tubes. As alternatives, the storage elements 22 can be deposited by chemical deposition techniques or can be mechined separately and then placed on the tube portion 12.

Each erase portion 30 can be associated with more than one storage portion 28. Also, each storage portion 28 can have associated with it more than one erase portion.

Figure 1B:
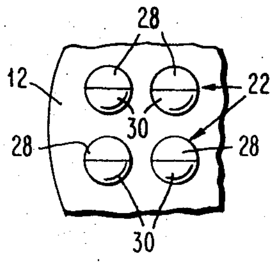

In FIG. 1B, a front view of a fragmentary portion of the inner face of tube portion 12 is shown, together with the storage elements 22. While the storage elements 22 are conveniently deposited directly onto face 12, they can be fabricated onto a sheet, other than face 12. For instance, a mica substrate is suitable.

The tube is operated as follows. Electron beam from gun 14a hits the target screen and produces color centers in those storage portions 28 which are struck. The physics of the formation of the color centers is readily understood by reference to any of the above listed publications or to the patent previously referenced. Because the physics of this operation are well understood, it will be stated here only that color centers are produced when the electron beam strikes a storage portion 28. For the erase cycle, an electron beam from gun 14b hits erase portions 30 adjacent to storage portions 28. If these are heat producing portions, the temperature of the erase portions struck by the beam will be raised sufficiently and the temperature of the adjacent storage portions 28 will also be raised, since there will be direct heat conductivity into the storage portions 28. Generally, if hackmanite is used as the storage material 7, both the erase portion and the storage portion will have their temperatures raised to at least 150° C.

In a typical operation, 1 percent of the screen is erased each time alphanumeric information is displayed. Typical values of accelerating voltage and current of the erase beam are 10 kV and 0.1 ma, respectively. The amount of energy needed to erase information written into the storage material has been studied by researchers in this field, and has been determined to be about 0.03 joules/$cm^2$.

Each storage portion 28 has the approximate dimensions: 250 microns × 250 microns × 10 microns (thickness). The erase portions 30 are generally adjacent the storage elements and have approximately the same dimensions. With a storage material such as hackmanite, operation efficiency is good, even for very small sizes; consequently, the dimensions of each storage element can be varied. Of course, the density of the storage elements 22 can be varied considerably when this concept of localized erasure is employed. Also, the dimensions of the storage elements 22 can be changed considerably without departing from the scope of this invention. As is now apparent, the same type of energy (electron beam) is used for both writing and erasure. Provision of erase portions 30 means that a separate light or heat source is not needed to effect erasure. Also, it is no longer necessary to erase all storage elements 22, when changing information content.

The following analysis contrasts the operation of this tube with a conventional storage device. In the tube of FIG. 1, color centers are produced when an electron beam hits the storage portions 28 of each element 22. For an erase cycle, an electron beam strikes the erase portions 30 and raises the temperature of both the erase portions and the storage portions by at least 100°. The time t required to raise the temperature is:

$$t=(W/E)\,I$$

where $W$ = energy to overcome specific heat of a solid = VC (100°), and V is the volume to be heated.

$E$ = accelerating voltage of the beam used for erasure.

$I$ = current of beam used for erasure.

The value of t is computed to be $3.3 \times 10^{-5}$ seconds if $E$ = 10kV, $I$ = 0.1ma, $C$ = 0.5 j/cm$^3$, and $V$ = 250u × 250u × 10u.

In a typical operation, 1 percent of the screen is erased each time new alphanumeric information is displayed. Assuming that the target screen contains $10^6$ bits (hackmanite spots), the total time for erasure is 0.32 seconds. This is 10 times faster than that required if the entire screen is erased by an external 10 Watt power supply. The rewriting is also faster because only selected hackmanite spots need to reradiated.

Figure 2:
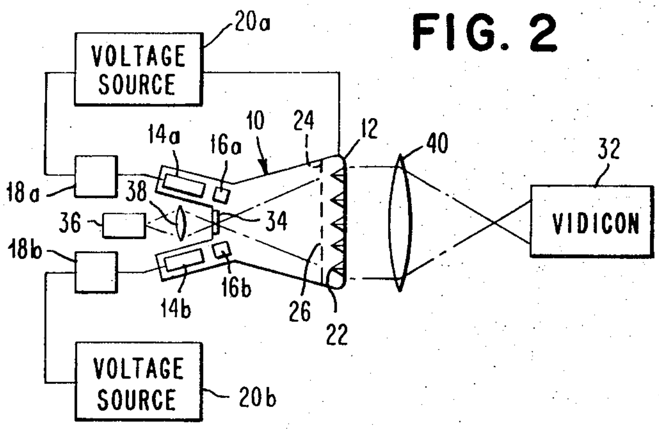
FIG. 2 shows a memory system utilizing a storage tube having localized erasure.

FIG. 2 shows a memory system using a storage tube 40 having pointwise erasure capability. Such a tube can serve as a beam addressable memory in which each storage element 22 (or group of elements) is viewed as a single bit of a memory. In order to read the state of any such element, a light sensing device, such as vidicon 32 is used. This device measures the light transmitted or diffusely scattered by each point 22 (information bit). Whereas a vidicon is shown in FIG. 2, the light sensing device could be a photodiode array or a photomultiplier in combination with light deflecting elements. The latter may be preferable since it retains the beam addressable characteristics of the storage tube 10.

In FIG. 2, the storage tube 10 is the same as that shown in FIG. 1. That is, there is a conventional tube having a target screen which has a plurality of the combination storage-erase portions 22. A window 34 is located in the back wall of the tube and a light source 36 produces light which passes through lens 38 before entering tube 10. This light is transmitted or scattered by each storage element 22 of the tube. The transmission or scattering properties of each storage element depends upon whether or not the element has information (color center or alteration of a color center) therein. A lens 40 (such as a fresnel lens) is adjacent the face 12 of the storage tube 10 and serves to condense the storage tube light output before it enters the light sensing device 32. Any conventional vidicon can be used as its function is the same as in previously known memories. Also, electron guns 14, deflection units 16, and control circuitry 18 are the same as these in FIG. 1.

Figure 3A:
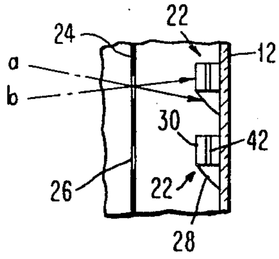
FIGS. 3A, 3B show a target screen having light emitting diodes or lasers as erase elements.
Figure 3B:
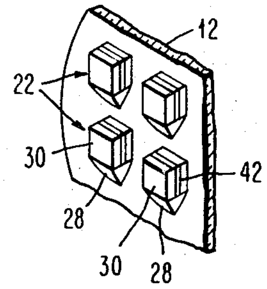

FIGS. 3A and 3B show a target screen in which the erase portions produce light, rather than heat. The erase portions could be either a phosphor or a light emitting diode. Although it is not necessary that the light emitting diode emit stimulated emission, such emission would not change the intended operation of the storage tube.

In FIG. 3A, a portion of a side view of the target screen is shown (as are beams $a,b$). Here, the metal mask 24 is located between the guns 14 and the tube face 12. Each storage element 22 has associated therewith a light producing erase portion 30. Both the storage portions and the erase portions are located on a glass plate, which could be the face 12 of the tube. As stated previously, the storage elements could be located on another substrate, such as a mica substrate. Such innovations are very common in the storage tube art, and any of them can be used in the practice of this invention.

FIG. 3B shows an oblique drawing of a portion of the target screen in which a few storage elements 22 are shown. In this case, the erase portions 30 are light emitting diodes which have their junction planes 42 substantially parallel to the glass substrate 12. When struck by an input beam, such as an electron beam, these diodes will emit light along their junction planes. The light will enter the associated storage portion and erase the information contained in that storage portion. This information is in the form of a color center and erasure will alter the state of these color centers.

In order to provide more efficient coupling of light into the storage portions, each face of diodes 30 not adjacent to a storage portion can be coated with a reflecting material so that the entire light output of the diodes is directed into the associated storage portions.

The operation of a light emitting diode is well known and will not be discussed in detail. It is only necessary to say that the input of electrons by an electron beam injects carriers into the diode and, by recombination processes, spontaneous or stimulated emission occurs. This output is from the junction plane of the diode. If the light emitting erase element 30 is a phosphor, then the incidence of electrons excites the phosphor material and it also emits light.

Operation with a light producing erase portion is sometimes advantageous over thermal bleaching operation because materials such as hackmanite are less likely to deteriorate under optical bleaching. Assuming the same dimensions for the storage and erase portions as those given previously, a color center density of $10^{15}$ cm$^{-2}$, and an efficiency of 0.05 percent for transfer of energy from an electron beam to color centers in the hackmanite, the time required for optical bleaching is $t = 5 \times 10^{-5}$ seconds.

Figure 4A:
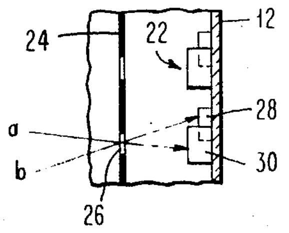
FIGS. 4A, 4B show a means of forming the storage and erase elements which allows a maximum of energy coupling between the erase and storage elements.
Figure 4B:
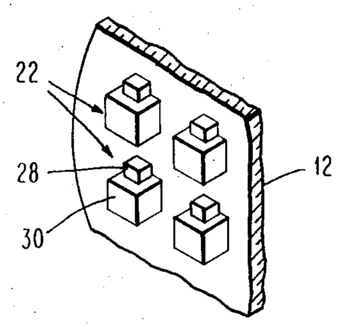

FIG. 4A is an illustration of a possible way of forming the erase and storage portions. Here, a side view of a portion of the target is shown in which each storage element 22 has associated therewith a heat producing erase portion 30. The erase portions partially overlap each storage portion so that there is maximum heat conduction into the storage portions. As is shown with previous storage screens a metal mask 24 is used to limit the input beams ($a,b$) to the area of the storage elements. The storage elements are fabricated directly on the glass face 12 of the tube or can be fabricated on another substrate.

Although the storage-and erase portions are formed adjacent to one another or in overlapping relationship, it is readily understood that any other geometry could be employed without departing from the scope of this invention. Generally speaking, the elements are arranged so that there is a maximum of energy transfer between the storage and erase portions. Depending upon the nature of the materials used, a varying amount of energy will be needed to change the information written into a storage element 22. In addition, if most of the output energy of the erase portion is coupled into the associated storage element, there will be a minimum of background heat or radiation in the tube. This in turn will provide more efficient operation.

Figure 5:
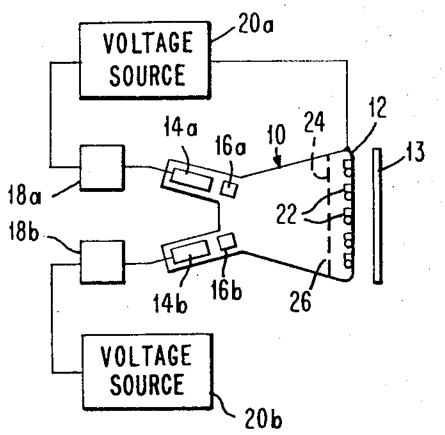
FIG. 5 shows a storage and display tube having localized erasure, which uses as storage elements photodichroic materials.

FIG. 5 shows a storage and display system in which the light sensitive screen contains dichroic centers rather than conventional photochomic materials, as was the case in the previously shown embodiments. The writing electron beams do not strike the storage material directly nor do they directly create the color centers in the storage material. The diochroic centers in the storage material rotate as a function of the direction of illumination produced by the adjacent erase portions. In order to understand the physics and operation of a memory of this type, reference is again made to U.S. Pat. No. 3,466,616. That patent describes how the color center orientations in the dichroic material are altered by the incidence of light from different directions.

In FIG. 5, a conventional storage tube is shown in which electron beams ($a,b$) are produced by guns 14*a*, 14*b*, as was the case in FIG. 1. As is the case with the other embodiments, only one electron beam need be used. Located on the inner portion of front face 12 is a storage target comprising a plurality of storage elements 22. In front of the storage target is a mask 24 which limits the input electron beams ($a,b$) to precise portions of the storage elements.

The electron guns 14 and their associated deflectors 16 and control circuitry 18 are conventional and will not be described further. As before, the storage-elements 22 can be deposited directly on the glass face 12 of the tube or can be located on a substrate separate from the glass tube face. The mask 24 serves the same function as that shown in FIGS. 1 and 2.

Located in front of tube 10 is a polarizing element 13, which is used to differentiate between the two orientations of the color centers. This polarizer can be in contact with the outer portion of face 12, if desired.

Figure 5A:
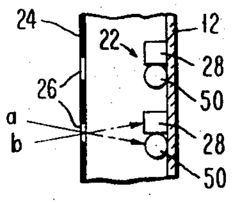
FIGS. 5A, 5B show two enlarged fragmentary views of the target screen which may be in the tube of FIG. 5
Figure 5B:
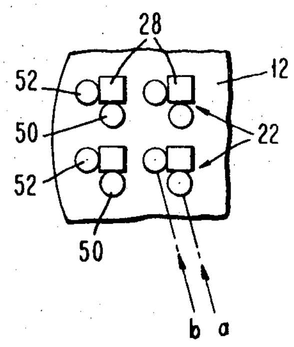

In FIGS. 5A and 5B, a side view and a front view of a portion of the target screen of FIG. 5 is shown. Each storage element 22 comprises a material having dichroic defects, such as M-centers or A-centers. Such defects are readily produced in alkali-halide crystals.

Located adjacent each storage portion 28 are two light producing elements 50, 52, which can be conventional phosphors. These phosphors are located on two sides of each storage portion 28 and will produce light into the storage portion from two different directions. That is, the light produced by phosphor element 50 will be emitted in a different direction than that produced by phosphor element 52. The dichroic centers in each storage portion 28 rotate as a function of the direction of illumination and it is this property which allows storage, display, and memory applications.

This tube 10 operates similarly to those described previously, with the exception that the electron beams do not strike the storage portion 28 nor do they directly create the color centers. These centers exist as dichroic defects in the crystalline lattice of the material comprising the storage portions and are rotated depending upon which adjacent phosphor 50 or 52 is excited. Consequently, in FIG. 5B, the paths of the electron beams (*a*,*b*) are shown as dashed lines striking the adjacent phosphors 50, 52 rather than the storage portions 28. Since light produced by one (50) adjacent phosphor is directed into the storage portion from a direction different than that produced by the other phosphor 52, storage possibly exists, as explained in U.S. Pat. No. 3,466,616.

With this type of storage element, as with the other storage elements, light beams can be used for reading and writing operations, in place of the electron beams. However, it may be desirable to use electron beams since, for many applications, these are easier to use.

Figure 6:
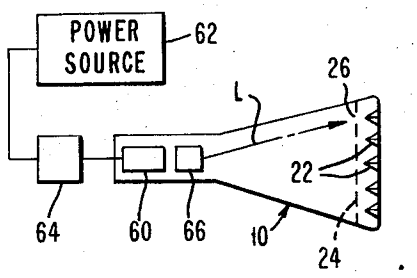
FIG. 6 shows a storage and display tube having localized erasure capability, in which a single light beam is used for both the erase and writing functions.

FIG. 6 shows an embodiment in which a light source is used in place of an electron beam for writing and erasing information. The storage target screen is any of the screens described previously. The light source 60 is powered by source 62, and has a modulator 64 for modulating the intensity of the output light beam. Deflectors 66, such as conventional electro-optic deflectors, are used to position to light beam 1, so as to select a particular storage element 22. Mask 24, with apertures 26, has the same function as previously discussed.

When light beams are used for writing and erasing, the same effects are used to put information into the storage elements and to erase it. That is, the erase portions produce heat and light in response to the input light beam and the storage elements are responsive to the input light beams in the same manner that they are responsive to input electron beams. That is, color centers are produced or altered and the total number of color centers activated varies depending upon the information to be displayed.

As is the case with conventional TV tubes, each storage element can be aluminized by a thin layer of aluminum which completely enclosed the storage-element. The overlying aluminum layer is then enough to allow electron beams to penetrate it, but will serve to reflect heat and light produced by the erase portions. This means that almost the entire percentage of output energy produced by the erase portion will be contained within the vicinity of the storage portion. This in turn will increase the efficiency of erasure.

While this invention is particularly useful for beam addressable memories, it is to be understood that any type of selection scheme in which storage elements are activated could be used. For instance, ultrasonic beams or surface acoustic beams could be used to activate storage elements. The storage elements do not have to be separate elements, but can be regions of a continuous sheet, which regions are selected by the input beams. This aspect of localized regions of a continuous sheet applies to both the storage portions and erase portions. It is only important that each region have associated therewith an erase portion which can be independently activated to influence the information state of the associated storage portion.

While the erase portions described herein produce heat or light which changes the information content of the associated storage portions, the invention is not to be considered to be restricted to just this mechanism for changing the storage of information. Both heat producing and light producing erase elements can be used on the same target screen. It is only necessary that the output energy of the erase portion be of the type necessary to erase the associated storage element, and of sufficient amplitude to do so.

What is claimed is:

1. A storage and display device comprising:
beam generating means;
storage elements capable of activation by said beam, said storage elements having a particular information state when activated;
erase elements, each one of which is associated with a different storage element, said erase elements providing energy when activated, by said beam, said energy being coupled to said associated storage element to control the information content of said storage elements;
deflection means for deflecting said beam to said storage elements and to said erase elements, whereby information is written into a particular storage element when said beam strikes said particular storage element, and information is erased from said particular storage element when said beam strikes an erase element associated with said particular storage element.

2. The device of claim 1, where said beam is an electron beam.

3. The device of claim 1, where said beam is a light beam.

4. The device of claim 1, where said erase elements are sufficiently close to said associated storage element that substantially all the energy output of said erase elements is coupled to said associated storage elements.

5. The device of claim 1, where said erase elements produce heat when activated by said heat.

6. The device of claim 1, where said erase elements produce light when activated by said beam.

7. The device of claim 4, where color centers are selectively produced in individual storage elements by said beam and heat is produced in selected erase elements when struck by said beam, said heat being sufficient to alter said color centers in only associated storage elements.

8. The device of claim 4, where said beam alters color centers and selected storage elements, said color centers being altered by selective activation of erase elements associated with said selected storage elements, said erase elements producing light when activated by said beam.

9. The device of claim 4, further including a light source whose output is directed onto said storage elements, and a photosensitive element responsive to the light scattered from said storage elements, said photo-sensitive elements scanning the light from said storage elements to create signals representative of the information displayed by said storage elements.

10. In a beam addressable storage and display tube having beam generating means and control circuitry to modulate the intensity of said beam and to deflect said beam, the improvement comprising:
an information target screen onto which impinges said beam, said screen having a plurality of data centers responsive to said beam, each center having an associated erase element on said target screen which is selectively activated by said beam to provide an energy output which removes information from only its data center.

11. The apparatus of claim 10, where said beam is an electron beam.

12. The apparatus of claim 10, where said erase elements produce heat which is coupled into said associated data centers.

13. The apparatus of claim 10, wherein at least one erase element produces light which is coupled into its associated data center.

14. A storage device comprising:

a first energy generating means, a first element capable of activation by said energy, said first element storing a particular information state when activated:

a second energy generating means, a second element associated with said first element onto which energy from said second generating means is incident, said second element providing an energy output to said first element when activated by said second generating means, said energy output erasing the information state of said first element.

15. The device of claim 14, where said first and second energy generating means are coincident.

16. The device of claim 14, where said first and second energy generating means provide electron beams.

17. The device of claim 14, where said first and second energy generating means provide light beams.

18. The device of claim 14, where said first element is comprised of a material in which color centers are formed by energy from said first generating means, said color centers being changed by the energy output of said second element.

19. The device of claim 14, where said second element produces heat energy outputs when activated by said second energy generating means.

20. The device of claim 14, where said second element produces light energy outputs when activated by said second energy generating means.

* * * * *